(12) United States Patent
Chen et al.

(10) Patent No.: US 6,243,498 B1
(45) Date of Patent: Jun. 5, 2001

(54) ADAPTIVE NON-UNIFORMITY COMPENSATION USING FEEDFORWARDING SHUNTING

(75) Inventors: Hai-Wen Chen, Tucson, AZ (US); Dennis C. Braunreiter, San Diego, CA (US); Harry A. Schmitt, Tucson, AZ (US)

(73) Assignee: Raytheon Company, Lexington, MA (US)

(*) Notice: Subject to any disclaimer, the term of this patent is extended or adjusted under 35 U.S.C. 154(b) by 0 days.

(21) Appl. No.: 09/175,213

(22) Filed: Oct. 19, 1998

(51) Int. Cl.[7] .............................. G06K 9/03; G06K 9/43; G06T 5/00
(52) U.S. Cl. .................... 382/260; 382/103; 382/255; 382/218; 250/347
(58) Field of Search ................................. 382/103, 218, 382/255, 263, 264, 262, 261, 260, 275, 254, 266, 269, 106; 348/169, 607, 241, 252, 625, 345, 348; 250/347, 332, 208.1

(56) References Cited

U.S. PATENT DOCUMENTS

| | | |
|---|---|---|
| 4,975,864 | 12/1990 | Sendall et al. . |
| 5,400,161 | 3/1995 | Lambert, Jr. . |
| 5,721,427 | 2/1998 | King et al. . |
| 5,903,659 * | 5/1999 | Kilgore ................................. 382/255 |

* cited by examiner

Primary Examiner—Thomas D. Lee
(74) Attorney, Agent, or Firm—David W. Collins; Glenn H. Lenzen, Jr.

(57) ABSTRACT

A system and method adapted for use with a focal plane array of electromagnetic energy detectors to receive first and second frames of image data from electromagnetic energy received from at least a portion of a scene. The first frame is a focused frame and the second frame is an unfocused frame. In a feed-forward path the system compares the first frame to the second frame and provides an error signal in response thereto. In a main path, the system multiplies at least a portion of the second frame of image data with the error signal to provide an noise error corrected output signal. In the preferred embodiment, the error signal is scaled prior to being multiplied by the second frame. An anti-mean (high pass) filter is provided to remove dome shading effects from the frames of image data. In the best mode, the anti-mean filter is disposed in the main path and blurred and focused outputs therefrom are weighted, averaged and stored. The weighted, averaged and stored focused frames are compared to the weighted, averaged and stored blurred frames to provide a fixed pattern noise error signal. A temporal noise error signal is identified from the weighted, averaged and stored focused frames. The fixed pattern and temporal noise error signals are fed forward and shunted from a current frame using multiplication or division. Thereafter, a constant mean value may be added to provide the output signal. Pixel replacement is consolidated into a single circuit and positioned prior to the anti-mean filter.

43 Claims, 3 Drawing Sheets

ADAPTIVE NON-UNIFORMITY COMPENSATION USING FEEDFORWARDING SHUNTING

BACKGROUND OF THE INVENTION

1. Field of the Invention

The present invention relates to image and data processing systems and techniques. More specifically, the present invention relates to systems and techniques for adaptive non-uniformity compensation for focal plane arrays of infrared detectors and the like.

2. Description of the Related Art

Focal plane arrays are used in military, astronomical and other applications. For example, in military applications, focal plane arrays are often used for target acquisition and tracking. The seekers of missiles often use arrays of image detectors sensitive to energy in the visible or (more typically) infrared portion of the electromagnetic spectrum. Unfortunately, these arrays, referred to as focal plane arrays are subject to anomalies such as detector to detector non-uniformity in sensitivity, gain/offset and fixed pattern noise. While numerous techniques are known in the art for addressing detector to detector nonuniformity in sensitivity, gain/offset, fixed pattern noise continues to be problematic.

Fixed pattern noise (FPNs) are sensor fixed artifacts induced by non-uniform response of the focal plane array (FPA). The non-uniform response causes the FPA output to be spatially varying even when illuminated by a uniform source. Techniques such as stored non-uniformity correction can correct for the non-uniform array response under static conditions. But dynamic inputs, such as changing photon flux induced by dome heating, requires dynamic or adaptive non-uniformity compensation.

Accordingly, nonuniformity compensation (NUC) systems have been developed to address detector to detector nonuniformities. In particular, adaptive nonuniformity compensation systems (ADNUC) have been developed to address fixed pattern noise in focal plane arrays of image detectors. Traditional ADNUC systems use an additive feedback algorithm wherein a correction-offset term is accumulated from an error-term which is generated from the filtered output image. The correction term is then subtracted from the next input image. Therefore, depending on the feedback coefficients (the nonlinear transfer functions), it takes about 10–30 image frames for the ADNUC systems to reduce the FPN from an initial high value to a low equilibrium value. While nominally effective, this system limits the response time of the system.

In addition, conventional ADNUC systems are not designed to remove temporally correlated temporal noise. Further, because FPNs are fixed on the focal plane and hence are temporally correlated, they present a more difficult false alarm problem than that presented by temporally uncorrelated temporal noise (TN). In traditional ADNUC systems, the accumulated correction-offset terms will cause fixed-pattern artifacts, which may lead to a high number of false alarms for target detection by the missile tracking system (i.e., the "tracker").

Further, traditional systems do not remove hot-dome shading effects. Hot dome shading is a heating of the missile dome due to aerodynamic friction effects. The heat on the dome creates a thermal background image which causes a filter mismatch in the tracker and thereby limits the performance of the system.

Hence, a need remains in the art for a system and technique for addressing fixed pattern noise in focal plane arrays. Specifically, there is a need for a system and technique for rapidly addressing fixed pattern noise, including temporal noise and dome shading, in focal plane arrays of infrared image detectors.

SUMMARY OF THE INVENTION

The need in the art is addressed by the adaptive nonuniformity compensation system and method of the present invention. The inventive system is adapted for use with a focal plane array of electromagnetic energy detectors and is adapted to receive first and second interleaved frames of image data from electromagnetic energy received from at least a portion of a scene within a field of view of the detectors. The first frame is a focused frame and the second frame is a blurred frame. In a feed-forward path the inventive system compares the first frame to the second frame and provides an error signal in response thereto. In a main path, the system multiplies (or divides) at least a portion of the second frame of image data with the error signal to provide an noise error corrected output signal.

In the preferred embodiment, the error signal is scaled prior to being multiplied or divided by the second frame. An anti-mean (high pass) filter is provided to remove dome shading effects from the frames of image data. In the best mode, the anti-mean filter is disposed in the main path and blurred and focused outputs therefrom are weighted, averaged and stored. The weighted, averaged and stored focused frames are compared to the weighted, averaged and stored blurred frames to provide a fixed pattern noise error signal. A temporal noise error signal is identified from the weighted, averaged and stored focused frames. The fixed pattern and temporal noise error signals are fed forward and shunted from a current frame using multiplication or division. Thereafter, a constant mean value may be added to provide the output signal. Pixel replacement can be consolidated into a single circuit and positioned prior to the anti-mean filter.

The invention provides a feedforward shunting system and technique which reduces fixed pattern noise on a frame by frame basis without accumulation of error terms from prior frames. The system uses the focused and blurred frame pairs and anti-mean filters to find spatial nonuniform regions in the image. For those pixels identified to be fixed pattern noise, the pixel value derived from the focal plane array is shunted (divided by a large number, typically 8 to 64). For non-fixed pattern noise pixels, the focal plane array output is unmodified. This shunting process leads to faster adaptation and results in reduced residual FPN and artifact generation.

Hence, the invention provides a system and technique for rapidly addressing fixed pattern noise, including temporal noise and dome shading, in focal plane arrays of infrared image detectors.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
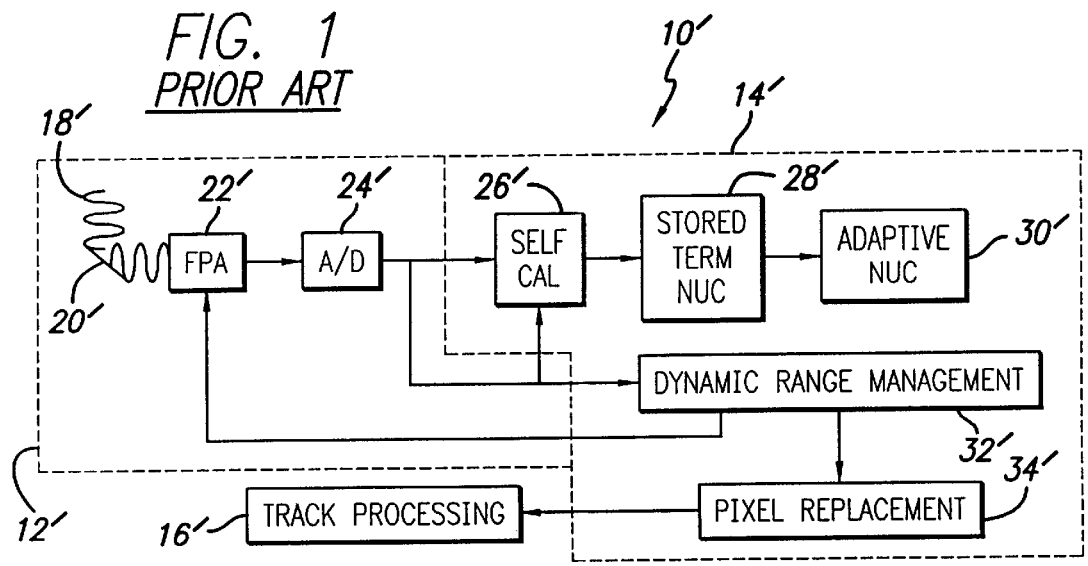
FIG. 1 is a block diagram of an infrared video processing system constructed in accordance with conventional teachings.

FIG. 1 is a block diagram of an infrared video processing system constructed in accordance with conventional teachings. The system 10' is implemented in hardware and software and includes an infrared camera 12'. The output of the video camera is processed by a video processing system 14' and a tracker 16'. Within the camera 12', infrared energy 18' from a scene is reflected by a deformable mirror 20' to a focal plane array (FPA) 22'. The output of the FPA 22' is digitized by an analog-to-digital (A/D) converter 24' and input to a self-calibration circuit 26'. The self-calibration circuit 26' is typically implemented with a digital signal processor. The output of the self-calibration circuit 26' is input to a stored term processing circuit 28'. The stored term nonuniformity compensation (NUC) circuit 28' eliminates nonuniformities in the focal plane array that are detected at the time of manufacture at two different temperatures. Accordingly, the stored term NUC circuit 28' is often referred to as a '2-point NUC'. The output of the 2-point NUC 28' is input to an adaptive nonuniformity compensation circuit (ADNUC) 30'. The conventional ADNUC 30' is described more fully below. The output of the ADNUC 30' is input to a dynamic range management circuit (DRM) 32'. Dead and defective pixels in the output image are replaced by a pixel replacement circuit 34' before the output signal is input to the tracker 16' for processing. Typically, the ADNUC is implemented with an application specific integrated circuit (ASIC) and the video processor 14' is implemented on a single chip.

The deformable mirror can provide blurred video frames between focused frames of video. The purpose of the blurring function is to uniformly spread the energy within the scene over the seeker field of view. These frames should then only exhibit nonuniformities due to the FPA 22'. As discussed more fully below, from the blurred frames, the ADNUC 30' develops offset correction terms to be applied in subsequent focused frames.

The FPA 22' may be an EDI-128/ST readout with InSb detectors. The function of the FPA is to convert the irradiance pattern at the detector array into an analog voltage waveform replicating the image. The output voltage of the FPA for the (i,j) pixel, with i representing column number and j representing row number, can be written in terms of the flux density at the pixel and the integration time:

$$VO_{ij} = Q_{ij} GO_{ij} t + OO_{ij} \qquad [1]$$

where $VO_{ij}$ is the FPA output voltage for the pixel, $Q_{ij}$ is the flux density at the detector element, $GO_{ij}$ is the responsivity of the pixel, t is the integration time, $OO_{ij}$ is the offset of the pixel, and the subscript "ij" refers to the (i,j) pixel. The integration time, t, is determined by DRM computation in the central processing unit (CPU) and is communicated to the FPA electronics through the off-gimbal electronics (OGE).

The A/D circuit 24' digitizes the raw output of the FPA 22'. The A/D also outputs an additional video line (e.g., row 129) that contains reference information utilized by the self-calibration circuit 26' and the dynamic range management circuit 32'. This additional data is stripped from the video immediately after the A/D converter 24'.

The video processing begins with the self-calibration circuit 26' which uses the FPA reference data (row 129) to compensate for analog drifts in the FPA 22', the A/D 24' and the bias circuitry therefor. The stored term NUC corrects the gross static nonuniformities of the FPA. While, the ADNUC compensates for the residual and dynamic changes of the nonuniformity. The dynamic range management circuit 32' maintains the FPA at maximum sensitivity by adjusting integration time and detector bias and maps the 16-bit output into a 14-bit output. Dynamic defective element and saturated pixel identification and replacement are also provided as a final step prior to passing the video to the first element of the track processing, the tracker spatial filter.

Figure 2:
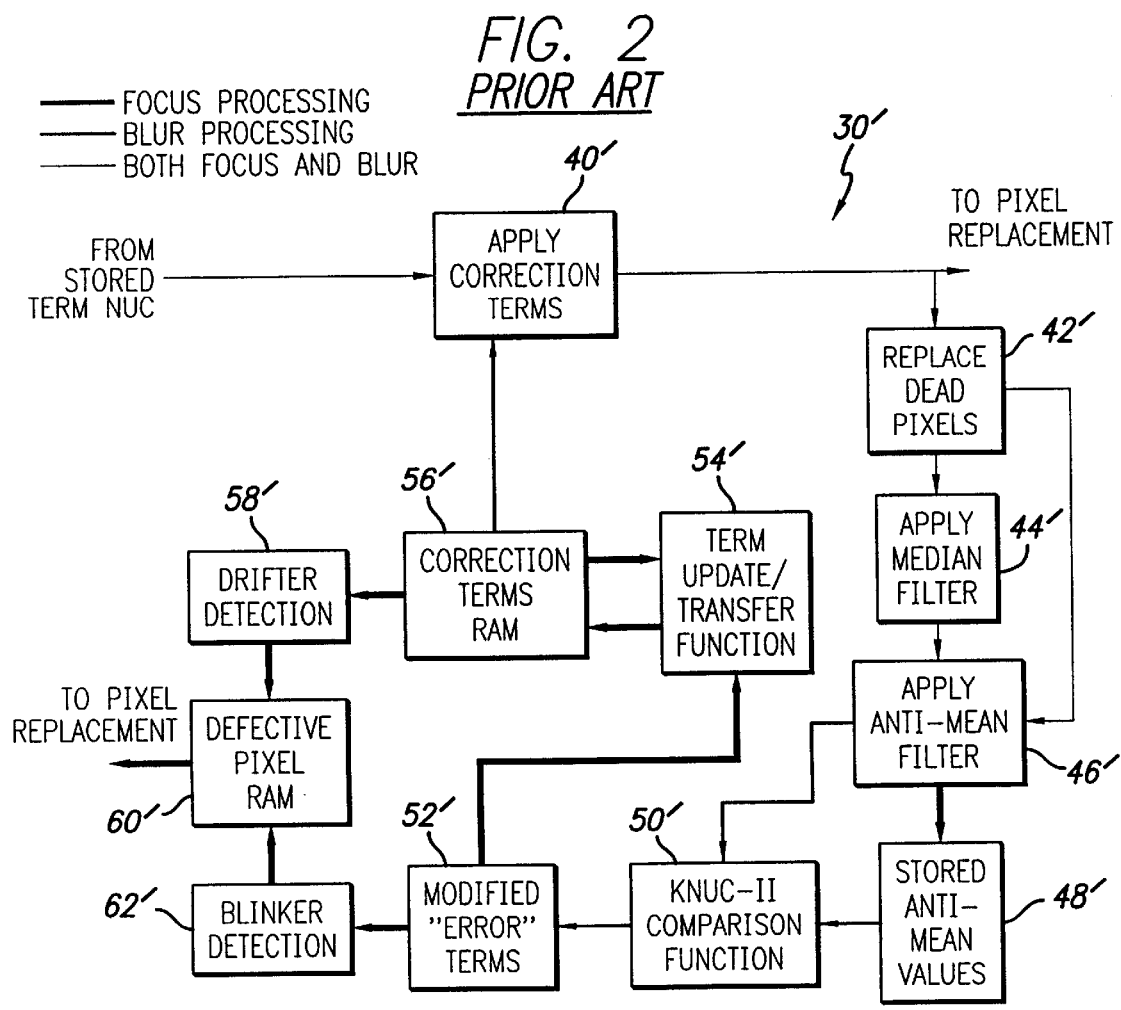
FIG. 2 shows an anti-mean filter in the feedback path as is typical of conventional teachings.

FIG. 2 is a block diagram of the ADNUC constructed in accordance with conventional teachings and implemented in the system depicted in FIG. 1. As is well known in the art, the conventional ADNUC 30' uses an additive feedback algorithm to adaptively suppress fixed pattern noise (FPN). Alternate images are blurred and focused by the optical system as discussed above. An estimate of the FPN is stored in a correction term random access memory (RAM) 56'. On each focus frame, the value in the correction term RAM 56' is subtracted from the FPA output to produce a corrected image. On each frame pair (one focus and one blur frame), pixels which have values that are deviant from its neighbors are detected by the anti-mean filter. For very small objects coming through the optical system, their amplitude is suppressed by the blurring operation. Thus, these pixels will have large anti-mean output differences between the focus and blurred frames. On the other hand, FPNs are unaffected by the optical system and hence produce the similar anti-mean outputs in both the blur and focus frames. The KNUC-II Comparison circuit 50' compares the outputs from the focus and blur frames to detect FPNs. For identified FPN occupied pixels, a fraction of the anti-mean output from the focus (or blurred) frame is accumulated in the Correction Term RAM 56' to estimate the FPN.

The Term Update/Transfer Function block 54' determines the fraction (feedback coefficient) of the error signal to be accumulated on each frame. It chooses the fraction to maintain a balance among the rate of correction, temporal noise (TN) reduction, and artifact minimization. Depending on the feedback coefficients used, it takes about 10–30 frames for the ADNUC to drive the FPN to steady state value. This method works well under static FPN conditions. However, the FPN changes dynamically during missile flight. The relatively long time required to reach steady state leads to an increase in the steady state value of the residual FPN. In addition, subtraction of the accumulated correction term from the focus frame leads to image artifacts when the scene is changed rapidly. The increased residual FPN and artifacts can create false alarms and tracker breaklocks. These and other problems are addressed by the adaptive nonuniformity compensation system and method of the present invention.

The inventive system is adapted for use with a focal plane array of electromagnetic energy detectors and is adapted to receive first and second frames of image data from electromagnetic energy received from at least a portion of a scene within a field of view of the detectors. The first frame is a focused frame and the second frame is an unfocused frame. In a feed-forward path the inventive system compares the first frame to the second frame and provides an error signal in response thereto. In a main path, the system multiplies (or divides) at least a portion of the second frame of image data with the error signal to provide an noise error corrected output signal.

In the preferred embodiment, the error signal is scaled prior to being multiplied or divided by the second frame. An anti-mean (high pass) filter is provided to remove dome shading effects from the frames of image data. In the best mode, the anti-mean filter is disposed in the main path and blurred and focused outputs therefrom are weighted, averaged and stored. The weighted, averaged and stored focused frames are compared to the weighted, averaged and stored blurred frames to provide a fixed pattern noise error signal. A temporal noise error signal is identified from the weighted, averaged and stored focused frames. The fixed pattern and temporal noise error signals are fed forward and shunted from a current frame using multiplication or division. Thereafter, a constant mean value may be added to provide the output signal. Pixel replacement can be consolidated into a single circuit and positioned prior to the anti-mean filter.

The invention provides a feedforward shunting system and technique which reduces fixed pattern noise on a frame by frame basis without accumulation of error terms from prior frames. The system uses the focused and blurred frame pairs and anti-mean filters to find spatial nonuniform regions in the image. For those pixels identified to be fixed pattern noise, the pixel value derived from the focal plane array is shunted (divided by a large number, typically 8 to 64). For non-fixed pattern noise pixels, the focal plane array output is unmodified. This shunting process leads to faster adaptation and results in reduced residual FPN and artifact generation.

Hence, the invention provides a system and technique for rapidly addressing fixed pattern noise, including temporal noise and dome shading, in focal plane arrays of infrared image detectors.

Figure 3:
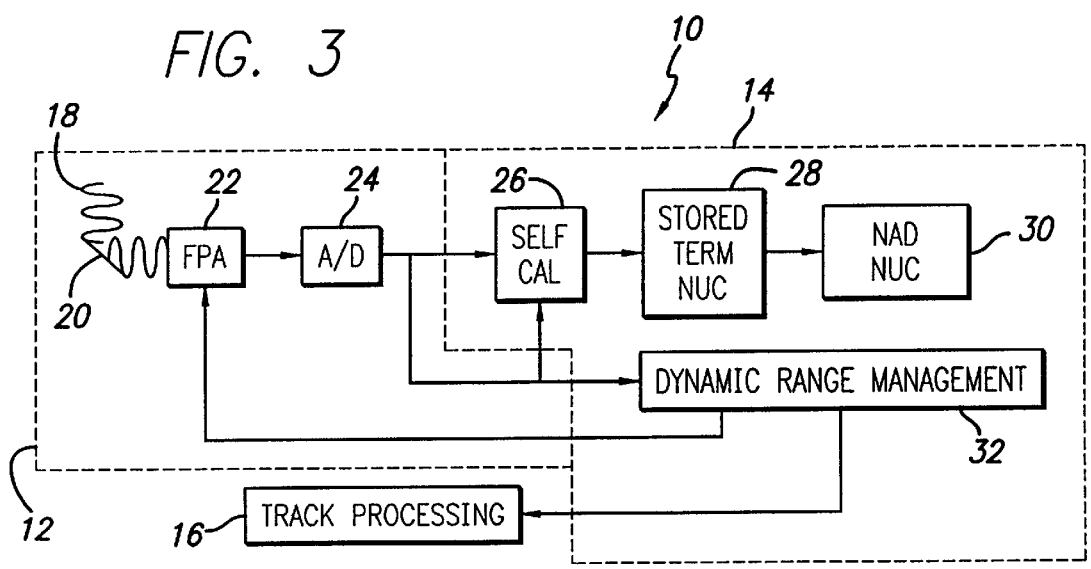
FIG. 3 is a block diagram of an infrared video processing system constructed in accordance with the teachings of the present invention.

FIG. 3 is a block diagram of an infrared video processing system constructed in accordance with the teachings of the present invention. The inventive system 10 is similar to the system 10' of FIG. 1 with the exception that the pixel replacement circuit 34' of FIG. 1 is consolidated into a pixel replacement circuit in a nontraditional adaptive nonuniformity correction (NADNUC) circuit 30 constructed in accordance with the present teachings.

Recent research in human and monkey visual systems have shown that shunting (multiplicative/divisive) feedback and feedforward mechanisms provide faster adaptation than traditional additive/subtractive feedback mechanism (See "Modeling and Identification of Parallel Non-linear Systems: Structural Classification and Parameter Estimation Methods," by Hai-Wen Chen, *Proceedings of the IEEE*, vol. 83, pp. 39–66, 1995; "Non-linear Neural Networks: Principles, Mechanisms, and Architectures," by S. Grossberg, *Neural Networks*, vol. 1, pp. 17–61, 1988; "Model for Visual Luminance Discrimination and Flicker Detection," by G. Sperling and M. M. Sondhi, *Journal of Opt. Soc. Am.*, vol. 58, pp. 1133–1145, 1968; and "Summation and Division by Neurons in Primate Visual Cortex," by M. Carandini and D. Heeger, *Science*, vol. 264, pp. 1333–1336, 1994.)

The NADNUC 30 of the present invention uses a feedforward shunting methodology to reduce FPNs on a frame by frame basis without accumulation of error terms from prior frames. As in the traditional ADNUC 30', the NADNUC 30 uses the focused and blurred frame pairs and anti-mean filters to find spatial nonuniform regions in the image. A NADNUC comparison block performs the equivalent FPN detection function performed by the KNUC Comparison block. For those pixels identified to be FPN, the pixel value derived from the FPA is shunted (divided by a large number, typically 8 to 64). For non-FPN pixels, the FPA output is unmodified. This shunting process leads to faster adaptation and results in reduced residual FPN and artifact generation.

Figure 4:
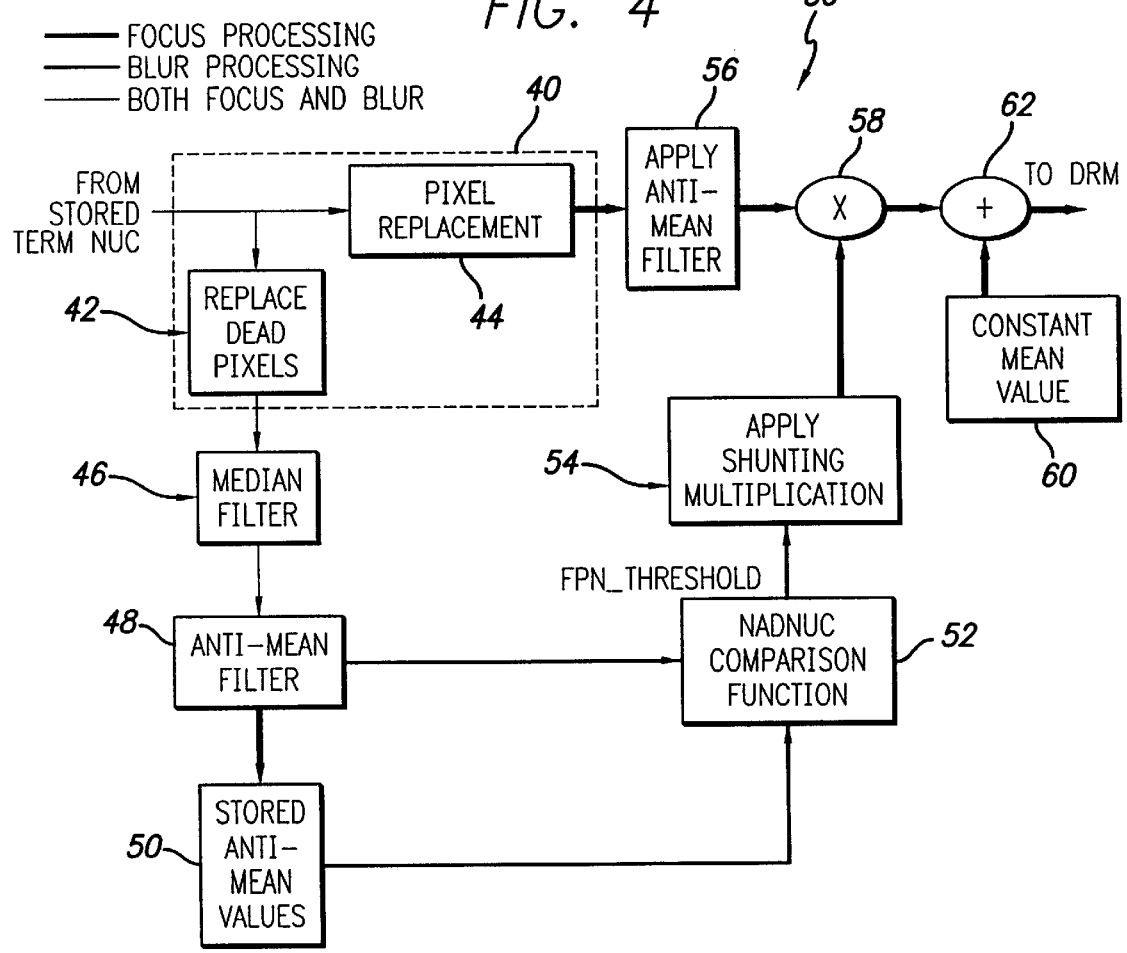
FIG. 4 shows an illustrative embodiment of the nontraditional adaptive nonuniformity correction circuit constructed in accordance with the teachings of the present invention.

FIG. 4 shows an illustrative embodiment of the nontraditional adaptive nonuniformity correction circuit constructed in accordance with the teachings of the present invention. As in the traditional ADNUC, the basic NADNUC uses the focused and blurred frame pairs and anti-mean filters to find spatial nonuniform regions in the image. Blurred and focused frames from the stored term NUC 28 are input to a pixel replacement circuit 42 which removes dead pixels from each frame. Next, in a feedforward path, the blurred and focused frames are low pass filtered with a median filter 46 and high pass filtered with an anti-mean filter 48 to remove the effects of dome shading as per conventional teachings. Anti-mean values from a first frame are stored in a memory 50 and digitally compared to anti-mean values from a current frame by a NADNUC comparator 52.

The traditional ADNUC system 30' uses only the high spatial frequency (SF) channel to process the non-uniformity compensation. Only the signals which can pass through the anti-means filter (the high SF channel) in the feedback pathway can get compensated by the ADNUC circuit 30'. For a 3×3 or a 5×5 anti-mean filter size, some low spatial frequency (SF) noise and the dome shading can not pass through the filter, and exactly the same as the anti-mean filter used in the ADNUC chip, the uncompensated low SF noise and dome shading will again be filtered out, and the tracker only sees the compensated video signals. However, if the spatial filter in the tracker is different (in size or type) from the one in the ADNUC, some of the uncompensated low SF noise and dome shading will pass through the filter and cause higher FPN.

In the non-traditional ADNUC system 30 of the present invention, the input image is divided into a high SF component (the output of an anti-mean filter) and a low SF component (the output of a mean filter) by using an anti-mean filter. The high SF component is then processed by applying the feedforward shunting (multiplicative) algorithm. The resulting component is then added by a constant mean value (this process is essentially removing the low SF component containing the uncompensated low SF noise and (independently from the choice of the anti-mean filter in the NADNUC system 30) without worrying about the filter mismatch problem, since the uncompensated low SF noise and dome shading have been filtered out.

The NADNUC comparator 52 performs the equivalent FPN detection function performed by the KNUC comparison circuit 50' of FIG. 2. The output of the NADNUC comparator 52 is fixed pattern noise (FPN). FPN values above a selectable NADNUC threshold are scaled by a first multiplier 54 and multiplied with corresponding pixels in a current frame by a second multiplier 58 after the current frame is filtered by a second anti-mean filter 56 to remove the effects of dome shading in the main path. The anti-mean filter is a high pass filter which is adjustable about a window.

The provision of an anti-mean filter in the main path allows for the elimination of the effects of dome shading in the NADNUC circuit 30 and is one of several significant features of the present invention. This is illustrated by FIG. 2 which shows an anti-mean filter 46' in the feedback path as is typical of conventional teachings. This is due to the need to provide a noise signal with zero mean suitable for comparison. Hence, the ADNUC circuits of the prior art do not remove dome shading and leave the distortion caused thereby to the tracker for handling. This complicates the design and limits the performance of the tracker 16 as will be appreciated by those skilled in the art.

The multiplication of the FPN occupied pixels with a small number (or the equivalent division of the FPN pixels by a large number) reduces or "shunts" the effects of these pixels on the current frame. That is, for those pixels identified to be FPN, the pixel value derived from the FPA is shunted (divided by a large number, typically 8 to 64). For non-FPN pixels, the FPA output is unmodified. As a result of the shunting process, the amplitude of FPN occupied pixels are driven toward zero. This shunting process leads to faster adaptation and results in reduced residual FPN and artifact generation.

A constant mean value (e.g., an additive fixed constant typically 6000 to 7000 in a 14 bit image) 60 is added to the current frame pixels by a summer 62 to insure positive pixel values are input to the tracker 16. In this way, the low frequency nonuniformities are essentially suppressed and replaced with a DC term. The low frequency nonuniformities then become transparent to the signal processor independent of its spatial filter.

Figure 5:
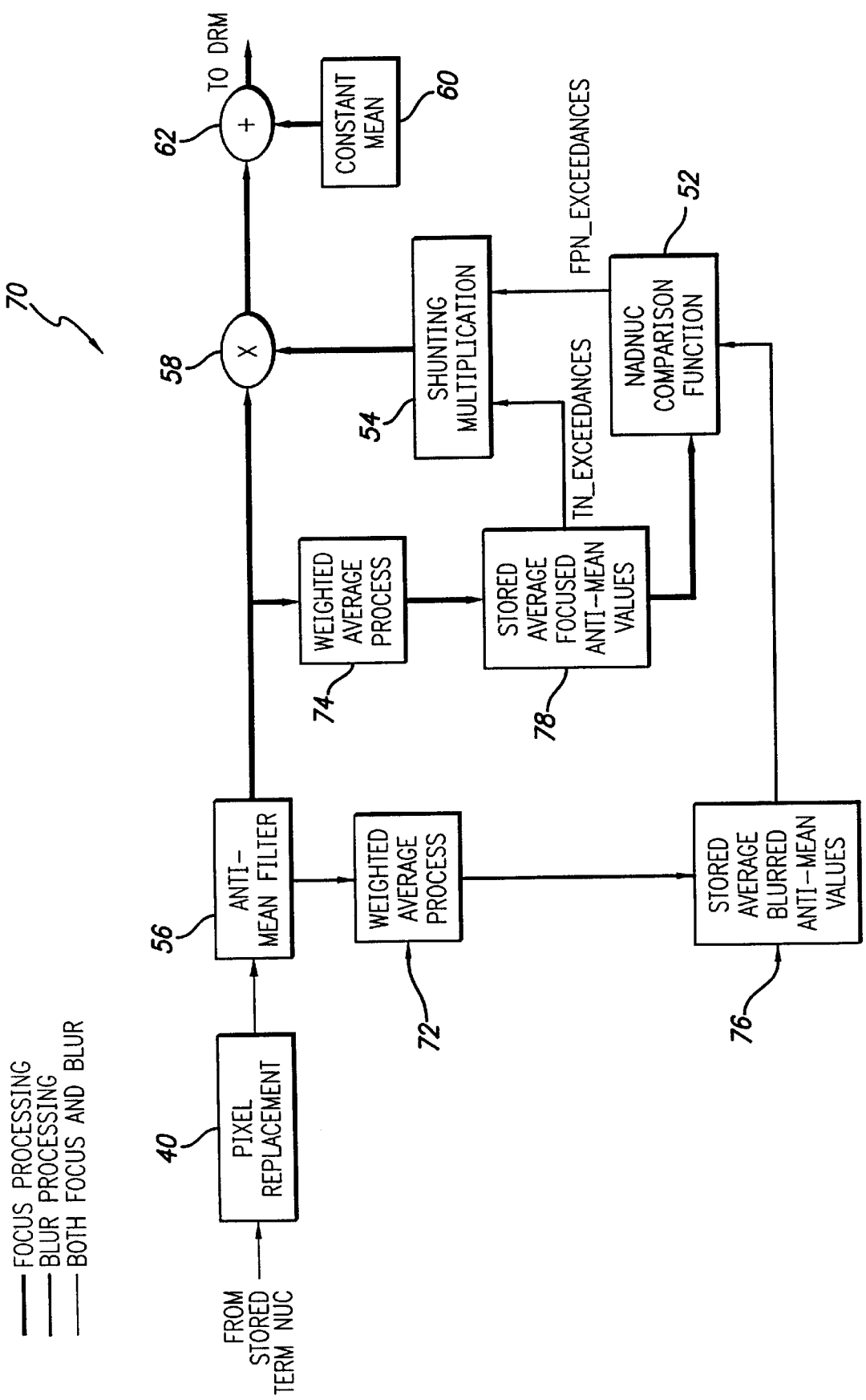
FIG. 5 is a block diagram of a preferred embodiment of the nontraditional adaptive nonuniformity correction circuit constructed in accordance with the present teachings.

FIG. 5 is a block diagram of a preferred embodiment of the nontraditional adaptive nonuniformity correction circuit constructed in accordance with the present teachings. The AV-NADNUC system 70 of FIG. 5 includes the pixel replacement circuit 40 of FIG. 4. The two anti-mean filters 48, 56 in FIG. 4 is reduced to one anti-mean filter 56 in FIG. 5, and the median filter 46 in FIG. 4 is eliminated in the AV-NADNUC system without worsening the performance. In addition, the NADNUC comparator 52, shunting multiplication 54, anti-mean filter 56, multiplier 58, constant mean memory 60 and summer 62 are implemented as shown and described in FIG. 4. Circuits 72 and 74 provide a weighted average of a predetermined number of frames output by the anti-mean circuit 56. Blurred averaged frames are stored in a first memory 76 and focused averaged frames are stored in a second memory 78.

If the NADNUC threshold is set equal to the KNUC-II threshold, the NADNUC system 30 will have the same target detectability as the traditional ADNUC 30'. The lower the threshold, the weaker the intensity of a target can be detected. However, in this case, more noise will pass through the system without being shunted. To solve this problem, the averaged NADNUC (AV-NADNUC) system 70 of FIG. 5 is designed so that instead of comparing a single anti-mean focused frame with a single anti-mean blurred frame, as the case in FIG. 4, the NADNUC comparison function compares the averaged anti-mean focused frame with averaged anti-mean blurred frame which is an accumulation of all the previous frames with the highest weighting for the most recent frame. The averaged frame has lower temporal noise (the average effect). Therefore, for the same obtained FPN level, the AV-NADNUC system 70 of FIG. 5 can set a lower threshold, and thus can pass weaker targets (i.e., higher target detectability) than the NADNUC system 30.

The difference of the absolute image pixel values in the averaged anti-mean focused and blurred frame pair is compared with the NADNUC threshold. The shunting process is the same as described above. The average process may have different choices, depending on how to weigh the previous frames versus the current one. The following recursive algorithm is used in the test for the weighted average:

$$Fca=(Fc+Fpa)/2 \qquad [2]$$

where, Fca is the current averaged frame, Fc the current frame, and Fpa the previous averaged frame. Equation [2] shows that the current frame has the highest weighting and a previous frame gets less and less weighting with the time going on (a decay rate of $2^i$, where i is the frame number).

A more general case of equation [2] is $$Fca=(Fc+Fpa* r), (1+r) \qquad [3]$$

where r is the weighting factor related to the decay rate of the previous frames. It is seen that equation [2] is a special case of equation [3] when r =1. In general, a smaller r leads to a higher weighting for the current frame. When r=0 (i.e., no average), we obtain the basic NADNUC system in FIG. 4 where only the current focused and blurred frame pair is used for the NADNUC comparison function. A higher current frame weighting would be more suitable for nonstationary cases (such as moving targets), but would be less effective in reducing temporal noise. The parameter r can be set to be adjustable depending on the applications. The regular (equally weighted) average process can be implemented by $$Fca=[Fc+Fpa *(i-1)]/i \qquad [4]$$

where i (=1, 2, 3, . . .) is the increasing frame number.

The output of the NADNUC comparison circuit 52 is input to the scaling (shunting multiplication) circuit 54 as per the embodiment 30 of FIG. 4. A second input to the scaling circuit 54 is provided by the second memory 78. The stored averaged focused anti-mean values are thresholded with a thresholding circuit 80 (not shown). The output of the thresholding circuit is input to the shunting multiplication circuit 54. The averaged focused frame can be used to set a TN threshold for reducing TN. The averaged values for pixels containing FPN and target will be high, while the averaged values for pixels containing mostly TN (zero-mean TN after the anti-mean filter) will be close to zero. Furthermore, since the output of the shunting process is very sensitive to the threshold level, both FPN and TN thresholds can be adaptively adjustable for maintaining a constant exceedance level (e.g., using an adjustable multiplying factor controlled adaptively by the tracker).

The averaged frames (focused and blurred) will have lower temporal noise (TN) than the single frames. Therefore, for a same NADNUC threshold, the NADNUC comparison function in the AV-NADNUC system 70 will allow more pixels in the input image to be shunted than the NADNUC system 30, leading to lower single frame noise (SFN), FPN, and TN.

Thus, the present invention has been described herein with reference to a particular embodiment for a particular application. Besides rapid suppression of FPN, the advantages of the NADNUC are:

Removal of low spatial frequency fixed pattern noise induced by dome shading;

Reduced amplitude of residual fixed pattern noise, artifacts, and temporal noise;

Temporal decorrelation of artifacts.

Those having ordinary skill in the art and access to the present teachings will recognize additional modifications applications and embodiments within the scope thereof It is therefore intended by the appended claims to cover any and all such applications, modifications and embodiments within the scope of the present invention.

Accordingly,

What is claimed is:

1. An adaptive nonuniformity correction system for a focal plane array of electromagnetic energy detectors comprising:

first means for generating first and second frames of image data from electromagnetic energy received from at least a portion of a scene within a field of view of said detectors, said first frame being focused and said second frame being unfocused;

second means disposed at least partially in a feed-forward path for comparing said first frame to said second frame and providing an error signal in response thereto, said second means including means for scaling said error signal and means for removing dome shading effects from said first frame and said second frame, said means for removing dome shading effects including an anti-mean filter and said anti-mean filter including a high pass filter; and third means disposed in a main path for multiplying at least a portion of said second frame of image data with said error signal and providing an noise error corrected output signal.

2. The invention of claim 1 wherein said second means includes a median filter.

3. The invention of claim 1 further including means disposed in said main path for removing dome shading effects.

4. The invention of claim 3 wherein said means disposed in said main path for removing dome shading effects is an anti-mean filter.

5. The invention of claim 4 wherein said anti-mean filter includes a high-pass filter.

6. The invention of claim 1 further including means for averaging a plurality of said first frames.

7. The invention of claim 6 further including means for averaging a plurality of said second frames.

8. The invention of claim 7 further including means for storing said averaged first frames.

9. The invention of claim 8 further including means for storing said averaged second frames.

10. The invention of claim 9 wherein said second means includes means for comparing said stored averaged first frames to said stored averaged second frames to provide said error signal and providing a fixed pattern noise error signal in response thereto.

11. The invention of claim 10 wherein said second means further includes means for identifying temporal noise in said stored averaged first frames of image data and providing a temporal noise error signal in response thereto.

12. The invention of claim 11 wherein said second means includes means for providing an adaptive nonuniformity correction of said stored averaged first and second frames.

13. The invention of claim 1 wherein said second means includes means for providing an adaptive nonuniformity correction of stored averaged first and second frames.

14. The invention of claim 1 further including means for adding a constant mean value to said noise error corrected output signal.

15. The invention of claim 1 including pixel replacement means disposed at the input to said second and said third means.

16. An infrared imaging system comprising:

a deformable mirror;

a focal plane array or infrared detectors adapted to provide alternating frames of image data;

first means for controlling said mirror to reflect alternating focused and blurred images from energy received from a scene to said focal plane array whereby said focal plane array outputs alternating first and second frames of image data corresponding to said focused and said blurred images respectively;

second means disposed at least partially in a feed-forward path for comparing said first frame to said second frame and providing an error signal in response thereto, said second means including means for scaling said error signal and means for removing dome shading effects from said first frame and said second frame, said means for removing dome shading effects including an anti-mean filter and said anti-mean filter including a high pass filter; and third means disposed in a main path for multiplying at least a portion of said second frame of image data with said error signal and providing an noise error corrected output signal.

17. The invention of claim 16 wherein said second means includes a median filter.

18. The invention of claim 16 further including means disposed in said main path for removing dome shading effects.

19. The invention of claim 18 wherein said means disposed in said main path for removing dome shading effects is an anti-mean filter.

20. The invention of claim 19 wherein said anti-mean filter includes a high-pass filter.

21. The invention of claim 19 further including means connected to the output of said anti-mean filter for weighting the output thereof.

22. The invention of claim 21 further including means connected to the output of said anti-mean filter for averaging a plurality of said first frames.

23. The invention of claim 22 further including means connected to the output of said anti-mean filter for averaging a plurality of said second frames.

24. The invention of claim 23 further including means for storing said averaged first frames.

25. The invention of claim 24 further including means for storing said averaged second frames.

26. The invention of claim 16 further including means for averaging a plurality of said first frames.

27. The invention of claim 26 further including means for averaging a plurality of said second frames.

28. The invention of claim 27 further including means for storing said averaged first frames.

29. The invention of claim 28 further including means for storing said averaged second frames.

30. The invention of claim 29 wherein said second means includes means for comparing said stored averaged first frames to said stored averaged second frames to provide said error signal and providing a fixed pattern noise error signal in response thereto.

31. The invention of claim 30 wherein said second means further includes means for identifying temporal noise in said stored averaged first frames of image data and providing a temporal noise error signal in response thereto.

32. The invention of claim 31 wherein said second means includes means for providing an adaptive nonuniformity correction of said stored averaged first and second frames.

33. The invention of claim 16 wherein said second means includes means for providing an adaptive nonuniformity correction of stored averaged first and second frames.

34. The invention of claim 16 further including means for adding a constant mean value to said noise error corrected output signal.

35. An adaptive nonuniformity correction system for a focal plane array of electromagnetic energy detectors comprising:
   first means for generating first and second frames of image data from electromagnetic energy received from at least a portion of a scene within a field of view of said detectors, said first frame being focused and said second frame being unfocused;
   second means disposed at least partially in a feed-forward path for comparing said first frame to said second frame and providing an error signal in response thereto;
   third means disposed in a main path for multiplying at least a portion of said second frame of image data with said error signal and providing an noise error corrected output signal; and
   fourth means disposed in said main path for removing dome shading effects from said first frame and said second frame, said means for removing dome shading effects including an anti-mean filter and said anti-mean filter including a high pass filter.

36. The invention of claim 35 further including means connected to the output of said anti-mean filter for weighting the output thereof.

37. The invention of claim 36 further including means connected to the output of said anti-mean filter for averaging a plurality of said first frames.

38. The invention of claim 37 further including means connected to the output of said anti-mean filter for averaging a plurality of said second frames.

39. The invention of claim 38 further including means for storing said averaged first frames.

40. The invention of claim 39 further including means for storing said averaged second frames.

41. An adaptive nonuniformity correction system for a focal plane array of electromagnetic energy detectors comprising:
   first means for generating first and second frames of image data from electromagnetic energy received from at least a portion of a scene within a field of view of said detectors, said first frame being focused and said second frame being unfocused;
   second means disposed at least partially in a feed-forward path for comparing said first frame to said second frame and providing an error signal in response thereto;
   third means disposed in a main path for multiplying at least a portion of said second frame of image data with said error signal and providing an noise error corrected output signal;
   means for averaging a plurality of said first frames;
   means for averaging a plurality of said second frames;
   means for storing said averaged first frames;
   means for storing said averaged second frames; and
   wherein said second means includes:
      means for comparing said stored averaged first frames to said stored averaged second frames to provide said error signal and providing a fixed pattern noise error signal in response thereto,
      means for identifying temporal noise in said stored averaged first frames of image data and providing a temporal noise error signal in response thereto, and
      means for providing an adaptive nonuniformity correction of said stored averaged first and second frames.

42. An infrared imaging system comprising:
   a deformable mirror;
   a focal plane array or infrared detectors adapted to provide alternating frames of image data;
   first means for controlling said mirror to reflect alternating focused and blurred images from energy received from a scene to said focal plane array whereby said focal plane array outputs alternating first and second frames of image data corresponding to said focused and said blurred images respectively;
   second means disposed at least partially in a feed-forward path for comparing said first frame to said second frame and providing an error signal in response thereto;
   third means disposed in a main path for multiplying at least a portion of said second frame of image data with said error signal and providing an noise error corrected output signal; and
   fourth means disposed in said main path for removing dome shading effects from said first frame and said second frame, said means for removing dome shading effects including an anti-mean filter and said anti-mean filter including a high pass filter.

43. An infrared imaging system comprising:
   a deformable mirror;
   a focal plane array or infrared detectors adapted to provide alternating frames of image data;
   first means for controlling said mirror to reflect alternating focused and blurred images from energy received from a scene to said focal plane array whereby said focal plane array outputs alternating first and second frames of image data corresponding to said focused and said blurred images respectively;
   second means disposed at least partially in a feed-forward path for comparing said first frame to said second frame and providing an error signal in response thereto;
   third means disposed in a main path for multiplying at least a portion of said second frame of image data with said error signal and providing an noise error corrected output signal;
   fourth means disposed in said main path for removing dome shading effects from said first frame and said second frame, said means for removing dome shading effects including an anti-mean filter; and
   fifth means for weighting the output of said anti-mean filter.

* * * * *